United States Patent
Dupont et al.

(10) Patent No.: US 9,056,932 B2
(45) Date of Patent: Jun. 16, 2015

(54) HYDROXY POLYALKYLENE GLYCOL FUNCTION (METH) ACRYLIC COMB POLYMERS, THEIR USE AS SHEAR-THINNING AGENTS IN COATING DISPERSIONS AND DISPERSIONS CONTAINING THEM

(75) Inventors: Francois Dupont, Lyons (FR); Murielle Guillot, Caluire et Cuire (FR); Renaud Souzy, Caluire et Cuire (FR); Jean-Marc Suau, Lucenay (FR)

(73) Assignee: COATEX, Genay (FR)

(*) Notice: Subject to any disclaimer, the term of this patent is extended or adjusted under 35 U.S.C. 154(b) by 200 days.

(21) Appl. No.: 13/150,430

(22) Filed: Jun. 1, 2011

(65) Prior Publication Data

US 2011/0305915 A1    Dec. 15, 2011

Related U.S. Application Data

(60) Provisional application No. 61/358,289, filed on Jun. 24, 2010.

(30) Foreign Application Priority Data

Jun. 10, 2010    (FR) ..................... 10 54575

(51) Int. Cl.
| | |
|---|---|
| *C08F 220/06* | (2006.01) |
| *C08F 220/28* | (2006.01) |
| *C08F 290/06* | (2006.01) |
| *C08K 3/26* | (2006.01) |
| *C08K 3/34* | (2006.01) |
| *B32B 27/10* | (2006.01) |
| *C09D 151/08* | (2006.01) |
| *D21H 19/36* | (2006.01) |
| *D21H 19/58* | (2006.01) |

(52) U.S. Cl.
CPC ............. *C08F 220/06* (2013.01); *C08F 220/28* (2013.01); *C08F 290/062* (2013.01); *C09D 151/08* (2013.01); *D21H 19/36* (2013.01); *D21H 19/58* (2013.01)

(58) Field of Classification Search
USPC ........... 428/511; 524/425, 447, 451, 556, 560
See application file for complete search history.

(56) References Cited

U.S. PATENT DOCUMENTS

| 5,707,445 A * | 1/1998 | Yamato et al. ................ 106/802 |
|---|---|---|
| 5,854,386 A | 12/1998 | Shen et al. |
| 6,034,208 A | 3/2000 | McDaniel et al. |
| 6,767,973 B2 * | 7/2004 | Suau et al. .................. 525/329.7 |
| 6,815,513 B2 * | 11/2004 | Le-Khac et al. ................ 526/89 |
| 8,034,869 B2 * | 10/2011 | Bobsein et al. ............... 524/503 |
| 2002/0091177 A1 | 7/2002 | Gonnon et al. |
| 2004/0019148 A1 | 1/2004 | Suau et al. |
| 2009/0170982 A1 * | 7/2009 | Dupont et al. .................. 524/52 |
| 2010/0076139 A1 | 3/2010 | Mongoin et al. |

FOREIGN PATENT DOCUMENTS

| EP | 1 201 624 A1 | 5/2002 |
|---|---|---|
| FR | 2 810 261 A1 | 12/2001 |
| FR | 2894998 A1 * | 6/2007 |
| FR | 2 913 426 A1 | 9/2008 |
| JP | 2004-525061 A | 8/2004 |
| WO | WO 2011/154789 A1 | 12/2011 |

OTHER PUBLICATIONS

International Search Report issued Jul. 15, 2011, in Patent Application No. PCT/IB2011/001064 (with English Translation of Category of Cited Documents).
Japanese Office Action issued Oct. 21, 2014 in Patent Application No. 2013-513769 (English Translation only).

* cited by examiner

*Primary Examiner* — Satya Sastri
(74) *Attorney, Agent, or Firm* — Oblon, McClelland, Maier & Neustadt, L.L.P.

(57) ABSTRACT

Comb polymers useful in paper coating dispersions.

16 Claims, No Drawings

HYDROXY POLYALKYLENE GLYCOL FUNCTION (METH) ACRYLIC COMB POLYMERS, THEIR USE AS SHEAR-THINNING AGENTS IN COATING DISPERSIONS AND DISPERSIONS CONTAINING THEM

REFERENCE TO PRIOR APPLICATIONS

This application claims priority to U.S. provisional application Ser. No. 61/358,289, filed Jun. 24, 2010; and to French patent application 10 54575, filed Jun. 10, 2010, both incorporated herein by reference.

FIELD OF THE INVENTION

The present invention concerns the field of paper and focuses more particularly on certain additives known as "rheology modifiers". These are used in the formulation of coating dispersions which are aqueous formulations designed to be applied to the surface of the sheet of paper.

SUMMARY OF THE INVENTION

The present invention is based on comb polymers featuring a (meth) acrylic skeleton with side chains of the hydroxy or alkoxy polyalkylene glycol type, and which enter into the composition of paper coating dispersions. Among other things, it offers an improvement based on the particular choice of a hydroxy group at the end of the side chain.

Compared to their predecessors of the prior art, the comb polymers of the present invention lead to a maintenance of water retention and viscosity at low shear gradient, but very significantly decrease the viscosity under high stress. This latter property, which reveals the polymers of the invention as shear-thinning agents, is particularly interesting for counteracting the phenomenon of increased blade pressure. This allows elevated dry extract and/or high speed deposit coating which corresponds to the current needs of the paper manufacturer.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BACKGROUND OF THE INVENTION

In the manufacture of paper sheets by coating, there is deposited on the surface of the base paper an aqueous composition called a "coating dispersion" the function of which is to confer on the sheet a number of properties such as opacity, brightness, whiteness, printability by gravure or offset printing processes, etc.

These coating dispersions contain water, one or more mineral fillers such as natural or synthetic calcium carbonate, kaolin, talc, or again, titanium oxide, one or more binders of a natural origin (like the carbohydrates such as starch, casein, carboxymethylcellulose—CMC), or of a synthetic origin (such as the styrene-butadiene, styrene-acrylic, vinyl copolymer latexes), as well as various additives (dispersants, water retention agents, optical brighteners, etc.).

Among these additives, there is a special category that allows the optimization of the rheological characteristics of the dispersion in relation to the coating process parameters and the properties sought for the dispersion: those of rheology modifiers. As indicated by their name, these products have the function of controlling the rheology of the dispersion, i.e. of adjusting its viscosity as a function of the stress that is applied to it.

In this regard, it is in the first place important to have an easily pumpable and filterable dispersion in the feed circuits of the coating process, with no tendency for the formation of foam or coating splash as well as a too rapid sedimentation. This requirement corresponds to an increase in the viscosity under low gradient shear, or a Brookfield™ viscosity measured at 100 RPM and at 25° C. with the device of the same name, without which the dispersion is too liquid.

Another important rheological characteristic is the viscosity under high shear gradient, as expressed by an ACAV viscosity at 25° C., measured in a capillary viscometer where the dispersion can be subjected to high shear gradients (from $10^5$ to $3 \times 10^6$ s$^{-1}$) of the same order of magnitude as those observed during the coating process in the application of the coating blade scraping off the excess dispersion deposited. The viscosity under high shear gradient is a determinant of the blade pressure to be applied. The higher the viscosity under high shear gradient, the higher the blade pressure must be to control the weight of the coat deposited.

However, the increase in the dry extract of coating dispersions and the increase in coating rates are trends that have been observed in recent years, because they have economic and/or quality advantages. Indeed, an increase in the dry extract of the coating dispersion permits a reduction in costs: the amount of energy needed for drying the dispersion is thus decreased. This increase also allows an improvement in the quality of the paper: the penetration of the dispersion into the base paper is reduced, which is favourable in the development of brightness. But this increase in dry extract leads to an increase in the viscosity under shear and as a consequence, to an increase the blade pressures required.

Higher coating speeds generate an increase in the hydraulic force on the blade and thus in the pressure to be exerted. Increases in blade pressure may then reach unacceptable levels and ones that are usually accompanied by dispersion overflows known by the terms "foams" or "beads".

It is therefore useful for the person skilled in the art to have a rheology modifier in order to obtain the necessary low shear gradient viscosity and to reduce the viscosity under high gradient in order to exploit the benefits of an increase in speed or an increase in the dry extract in coating dispersions without exceeding the limits of his process and avoiding the formation of overflows. This problem is reported in document WO 84/04491. This double problem of increasing the Brookfield™ viscosity and reducing the ACAV viscosity can be summarized as a search for a so-called "shear-thinning" agent.

In parallel with these rheological aspects is another fundamental property of the coating dispersion: its water retention: After deposit on the base paper, the dispersion has a natural tendency to transfer part or all of the water-soluble substances it contains into base paper. An attempt is therefore made to reduce as much as possible the migration of water and water-soluble substances in order to prevent an evolution of the rheology of the unused coating dispersion that is recycled in the coating process. This is referred to as the phenomenon of water retention which one seeks to improve, i.e. to increase.

A special category of rheology modifiers has been known for decades, one which allows an increase in the Brookfield™ viscosity of coating dispersions while improving their water retention. These are the comb polymers with a (meth) acrylic skeleton with alkoxy polyalkylene glycol side chains with the following general formula:

$$R-(AO)_m-(BO)_n-R'$$

where:
  m and n are integers that are less than or equal to 150, with at least one being a non-zero.
  A and B designate alkyl groups that differ from one another and have 2 to 4 carbon atoms, group AO preferentially designating ethylene oxide and group BO preferentially designating propylene oxide.
  R designates a polymerizable unsaturated function,
  R' designates a hydroxy or alkyl group with 1 to 5 carbon atoms.

These structures are described in documents WO 01/96007 A1, WO 04/044022 A1, WO 04/041883 A1, WO 07/069037 A1 and WO 08/149226 A1, all incorporated herein by reference. These polymers can be introduced in the coating dispersion through the suspension of mineral substances in which they improve the rheology (WO 01/96007 A1). In addition to their ability to increase the Brookfield™ viscosity of the dispersion, they help to improve the optical azuration (WO 04/044022 A1) and brightness (WO 04/041883 A1) thereof They are also known to increase the water retention of the dispersion (WO 07/069037 A1). However, it is also known that they increase very significantly the viscosity under high shear gradient (WO 08/149226 A1) which is not compatible with a high speed and/or elevated dry extract coating.

In addition, these polymers appear as complex structures, in the sense that they are defined through multiple variables: the anionic species for the monomer forming the main chain, the possibility of implementing a termonomer and/or a cross-linking agent, and for the side chain, the nature of the polymerizable function R, the nature and number of alkyloxylated units, and finally, the identity of the terminal group (hydroxy or alkoxy with 1 to 5 carbon atoms). In addition, the polymers predominantly illustrated in the above documents are acrylic acid and methacrylic acid copolymers, with methoxy polyethylene glycol methacrylate.

DETAILED DESCRIPTION OF THE PREFERRED EMBODIMENTS

Now, in an unexpected and quite advantageous manner, the present inventors have demonstrated that the move to side chains terminated by hydroxy groups leads to structures that are both new and that enable the maintenance of water retention and Brookfield™ viscosity at levels comparable to those achieved with comb polymers of the prior art with alkoxy terminals, but with an extremely marked reduction in the ACAV viscosity. Nobody had even thought of making such a substitution at the level of the terminal group of the side chain, and no factor could enable a predication that this choice would lead to such a benefit in the above-noted coating conditions.

In terms of results, and with respect to similar comb polymers but ones with the side chains terminated by an alkoxy group according to the prior art, the polymers of the present invention behave like:

water retention agents that are at least equivalent,
agents capable of increasing the viscosity under low shear gradient, at a comparable level,
shear-thinning agents, in the sense that they considerably decrease viscosity under high shear gradient.

There are henceforth now available rheological additives that are perfectly suited for use in a coating dispersion with an elevated dry extract and/or intended to be applied at high speed to the sheet of paper.

It is important to indicate that the substitution of the terminal alkoxy group by a hydroxy group on the side chain may be made by a method for the manufacture of such macromonomers that are then copolymerized with (meth) acrylic monomers. This technology is the subject of U.S. Pat. No. 6,034,208 B1, incorporated herein by reference. It is important to note that the technical domain relative to this patent is that of concrete and cement: the merit of the invention herein is all the greater, since they were able to identify a technical solution in a sector that is very remote from their own. Finally, it should be noted that the comb polymers that are the subject of this latter patent preferably have a mean molar mass by weight between 5,000 g/mol and 100,000 g/mol, which is a notable point of distinction with the polymers of the present invention, in which the mean molar mass by weight is at least equal to 1,000,000 g/mol.

Accordingly, a first object of the present invention consists of the above-mentioned polymers. Indeed, these latter are new compared to the structures described in patents WO 01/96007 A1,WO 04/044022 A1,WO 04/041883 A1, WO 07/069037 A1 and WO 08/149226 A1, to the extent that their definition results from multiple choices from the many lists which previously defined in a generic manner the comb polymers of the prior art. They are also new with respect to the structures described in U.S. Pat. No. 6,034,208 B1, as a result of their much higher mean molar mass by weight.

A second object of the present invention lies in an aqueous solution comprising water and at least one of these polymers. A third object is the use of these polymers as agents having the function of shear-thinning a coating dispersion. A fourth object resides in the coating dispersion that comprises these polymers, and another object is in a coating process for a sheet of paper that employs such a dispersion.

The first object of the present invention are comb polymers comprising, consisting essentially of, and consisting of, expressed in the molar percentage of each of its pre-polymerized constituents:
  a) from 60% to 90% acrylic and/or methacrylic acid, and preferentially acrylic acid and methacrylic acid, and
  b) from 10% to 40% of a monomer with the formula:

$$R-(EO)_m-(PO)_n-R'$$

where:
  m and n are non-zero integers less or equal to 150,
  EO and PO respectively designate ethylene oxide and propylene oxide,
  R designates the methacrylate function,
  R' designates a hydroxy group.

In a variant that is preferred and indicated above, the monomer a) is a mixture of acrylic acid and methacrylic acid. It is demonstrated that it is according to this variant that the greatest decrease in viscosity under high shear gradient is obtained.

This polymer is also characterized in that it preferably presents a mean molar mass by weight of between 1,000,000 and 6,000,000 g/mol, as determined by GPC. Reference can be made to the measurement technique described in document WO 07/069037 A1.

The polymer may obtained as described above and by the known methods of conventional free radical copolymerization in solution, in direct or inverse emulsion, in suspension or precipitation in suitable solvents, in the presence of known catalytic systems and transfer agents, or by processes of controlled radical polymerization such as the method known as Reversible Addition Fragmentation Transfer (RAFT), the method known as Atom Transfer Radical Polymerization (ATRP), the method called Nitroxide Mediated Polymerization (NMP), or even the method referred to as Cobaloxime Mediated Free Radical Polymerization.

It is obtained in the acid and possibly distilled form. It can also be partially or totally neutralized by one or more neutralization agents preferentially selected from the hydroxides of sodium and potassium and their mixtures.

Another object of the present invention is an aqueous solution comprising water and the above-mentioned comb polymer.

This solution is characterized in that it preferably presents a dry extract of between 10% and 45% by dry weight of the comb polymer in relation to its total weight.

In addition, the aqueous solution of polymer can contain one or more further rheological additives, which are preferentially an emulsion of the ASE type (inflatable alkali emulsion) constituted of (meth) acrylic acid and an ester of this (meth) acrylic acid chosen from ethyl and/or butyl acrylate, or an emulsion of the HASE (hydrophobically modified alkali soluble emulsion) type. The manufacturing method for these mixtures is described in document WO 08/149226 A1.

A third object of the present invention is the use of the aforementioned comb polymer in a paper coating dispersion as a shear-thinning agent of the dispersion. As already explained, the shear-thinning character here means that the polymer enables a reduction of the viscosity under high shear gradient (ACAV viscosity), with respect to the same comb polymer of the prior art, but not having a terminal hydroxy group on its side chain.

Another object of the present invention is a coating dispersion containing the aforementioned comb polymer.

This dispersion is also characterized in that it contains:
(a) from 3 parts to 20 parts, preferentially from 5 parts to 15 parts by dry weight of binder per 100 parts by dry weight of mineral substances.
(b) from 0.1 parts to 2 parts, preferentially from 0.1 parts to 1.5 parts by dry weight of comb polymer per 100 parts by dry weight of mineral substances.
(c) water in a quantity by weight of between 20% and 80%, in relation to the total weight of the coating dispersion.

The invention embodiments may in addition further comprise other additives used in compositions of coating dispersions, such as biocides, anti-foam agents, optical brighteners and optical brightener media, without however this list being exhaustive.

The dispersion is also characterized in that the mineral substance is preferably selected from natural or synthetic calcium carbonate, kaolin, talc and mixtures of these substances.

It is also characterized in that the binder is preferably chosen from among the water-soluble binders and notably starch, or from among the synthetic latex polymer binders such as styrene-acrylic and styrene-butadiene or their mixtures, or mixtures of these binders.

Finally, in a particular variant corresponding to a so-called "high dry extract" dispersion, it is also characterized in that it contains 20% to 35% by weight of water.

Another object of the present invention consists of a process for coating a sheet of paper by the application of the aforementioned dispersion to the surface of the sheet.

The following examples will allow a better understanding of the present invention, without however limiting its scope.

EXAMPLES

This test illustrates the manufacture of 3 paper coating dispersions, each of them using an aqueous emulsion at 25% by dry weight of a comb polymer according to the prior art (test No. 1), or a comb polymer according to the invention (tests No. 2 and 3).

For each of these tests, a coating dispersion is prepared consisting of:
100 parts by dry weight of calcium carbonate marketed by the company OMYA™ under the name Hydrocarb™ 95 ME,
0.6 part by dry weight (in relation to the dry weight of calcium carbonate) of the polymer to be tested,
8 parts by dry weight of a styrene-butadiene latex marketed by the DOW™ CHEMICALS company under the name DL 966,
0.4 part by dry weight of polyvinyl alcohol marketed by the CLARIANT™ company under the name Mowiol™ 4-98,
0.5 part by dry weight of an optical brightener marketed by the LANXESS™ company under the name Blankophor™ P, The dry extract of the dispersion is set at 70.5% of its total weight.

Test No. 1 illustrates the prior art and uses a polymer consisting of 67.5% in moles of acrylic acid, 17.5% in moles of methacrylic acid and 15% in moles of a monomer of formula (I) in which m=44, n=0 and R' is the methyl group.

Test no. 2 illustrates the preferred variant of the invention in which the carboxylic acid monomer is a mixture of acrylic and methacrylic acid, and which implements a polymer formed from 67.5% in moles of acrylic acid, 17.5% in moles of methacrylic acid and 15% in moles of a monomer of formula (I) in which m=30, n=70 and R' is the hydroxy group.

Test no. 3 illustrates the invention, and implements a polymer made up of 85% in moles of acrylic acid and 15% in moles of a monomer of formula (I) in which m=30, n=70 and R' is the hydroxy group.

These 3 polymers have a mean molar mass by weight in the order of 3,000,000 g/mol.

The Brookfield™ viscosities ($\mu B$) and ACAV viscosities ($\mu ACAV$) (measured at a shear gradient of $10^6$ s$^{-1}$) are determined at 25° C. as well as the water retention ($r_{H2O}$). Reference can be made to documents WO 07/069037 A1 and WO 08/149226 A1 for their determination and the apparatus used.

The results obtained are listed in table 1.

TABLE 1

| Test No. | Prior Art Invention | $\mu_B$ (mPa · s) | $\mu_{ACAV}$ (mPa · s) | $r_{H2O}$ |
|---|---|---|---|---|
| 1 | Prior Art | 780 | 171 | 114 |
| 2 | Invention | 980 | 101 | 112 |
| 3 | Invention | 850 | 158 | 112 |

These results demonstrate that while maintaining the Brookfield™ viscosity and the water retention at a level equivalent to the prior art, the polymers of the present invention enable a very large reduction in viscosity under high shear gradient.

This advantage is decisive in offsetting the blade pressure increase, particularly if it is desired to deposit this dispersion on a sheet of paper at high speed.

In addition, the best results are obtained for the polymer according test No. 2, which corresponds to the preferred variant of the invention implementing a mixture of acrylic and methacrylic acids.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A coating dispersion, comprising:
a binder, a mineral substance, a comb polymer, and water;
wherein the comb polymer comprises, expressed as molar percentages of its pre-polymerized constituents:
a) 60% to 90% acrylic and/or methacrylic acid, and
b) 10% to 40% of a monomer of the formula:

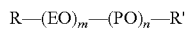

where:
wherein m =30 and n =70,
EO and PO respectively designate ethylene oxide and propylene oxide,
R designates a methacrylate function,
R' designates a hydroxy group, and
wherein the coating dispersion comprises the binder, the mineral substance and the water in the following amounts:
(a) from 3 parts to 20 parts by dry weight of the binder per 100 parts by dry weight of the mineral substance;
(b) from 0.1 parts to 2 parts by dry weight of the comb polymer per 100 parts by dry weight of the mineral substance; and
(c) water in a quantity by weight of 20%-80% in relation to the total weight of the coating dispersion,
wherein the total amount of the acrylic acid and methacrylic acid in the comb polymer is 85 mol %.

2. The coating dispersion according to claim 1, wherein said polymer has a mean molar mass by weight of 1,000,000-6,000,000 g/mol, as determined by GPC.

3. The coating dispersion according to claim 1, comprising both acrylic and methacrylic acid.

4. The coating dispersion according to claim 1, further comprising a rheological additive which is not the comb polymer.

5. The coating dispersion according to claim 4, wherein the rheological additive is selected from the group consisting of an ASE emulsion comprising (meth) acrylic acid and an ester of this (meth) acrylic acid chosen from ethyl and/or butyl acrylate, an HASE emulsion, and a mixture thereof.

6. The coating dispersion according to claim 1, wherein the mineral substance is selected from the group consisting of calcium carbonate, kaolin, talc and mixtures thereof.

7. The coating dispersion according to claim 1, wherein the binder is selected from the group consisting of starch, styrene-acrylic latex polymer binders, styrene-butadiene latex polymer binders, and mixtures thereof.

8. The coating dispersion according to claim 1, comprising water in a quantity by weight of 20% to 35% in relation to the total weight of the coating dispersion.

9. The coating dispersion according to claim 1, wherein the mineral substance is selected from the group consisting of calcium carbonate, kaolin, talc and mixtures thereof, the binder is selected from the group consisting of starch, styrene-acrylic latex polymer binders, styrene-butadiene latex polymer binders, and mixtures thereof, and wherein the dispersion comprises water in a quantity by weight of 20% to 35% in relation to the total weight of the coating dispersion.

10. A coating process, comprising applying a coating dispersion according to claim 1 to a surface of a sheet of paper.

11. A coating process, comprising applying a dispersion according to claim 9 to a surface of a sheet of paper.

12. A sheet of paper, having on a surface thereof the coating dispersion according to claim 1.

13. The coating dispersion according to claim 1, wherein the comb polymer consists essentially of monomers (a) and (b).

14. The coating dispersion according to claim 1, wherein the comb polymer consists of polymerized units of methacrylic acid, acrylic acid and monomer (b).

15. The coating dispersion of claim 1, wherein the comb polymer has an average molar mass of 3,000,000 g/mol.

16. A coating dispersion, comprising:
a binder, a mineral substance, a comb polymer, and water;
wherein the comb polymer comprises, expressed as molar percentages of its pre-polymerized constituents:
a) from 67.5 mol % to 85 mol % acrylic acid, up to 17.5 mol % methacrylic acid, and
b) 15% mol % of a monomer of the formula:

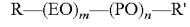

where:
wherein m =30 and n =70,
EO and PO respectively designate ethylene oxide and propylene oxide,
R designates a methacrylate function,
R' designates a hydroxy group, and
wherein the comb polymer has an average molar mass of 3,000,000 g/mol; and
wherein the coating dispersion comprises the binder, the mineral substance and the water in the following amounts:
(a) from 3 parts to 20 parts by dry weight of the binder per 100 parts by dry weight of the mineral substance;

(b) from 0.1 parts to 2 parts by dry weight of the comb polymer per 100 parts by dry weight of the mineral substance; and
(c) water in a quantity by weight of 20%-80% in relation to the total weight of the coating dispersion.

\* \* \* \* \*